UNITED STATES PATENT OFFICE.

FELIX EISCH AND EDWARD RACZINSKI, OF MILWAUKEE, WISCONSIN, ASSIGNORS OF ONE-THIRD TO NORBERT GEORGE METSCHL, OF SAME PLACE.

COMPOSITION FOR KILLING CANADA THISTLES.

SPECIFICATION forming part of Letters Patent No. 669,725, dated March 12, 1901.

Application filed January 9, 1901. Serial No. 42,634. (No specimens.)

*To all whom it may concern:*

Be it known that we, FELIX EISCH and EDWARD RACZINSKI, of Milwaukee, Wisconsin, have invented a new and useful Composition of Matter for Killing Canada Thistles, of which the following is a specification.

Our novel composition consists of the following ingredients combined in the proportions stated, as follows: water, pure and hot, four quarts; water-glass, (soluble glass,) one-half pound; caustic soda, ninety-eight per cent. strength, five pounds; borax, one pound.

The caustic soda and the borax are to be completely dissolved, and all the ingredients are to be thoroughly mixed by agitation.

In preparing the composition the water should not be boiling hot, but should be raised to about 120° Fahrenheit, and the water-glass should then be added, which will quickly dissolve and permeate or mix with the water, and thereupon the soda should be added gradually, a little at a time, and preferably during about fifteen minutes, in all of which time the mixture is to be constantly stirred, and thereupon the borax is to be added, and this must be put in gradually, a little at a time, occupying about ten minutes in putting it in, during which time the mixture must be stirred constantly. The agitation or stirring of the mixture should in all be continued for at least one-half an hour.

In using the above composition the Canada thistle should be cut off close to the surface of the ground and about a table-spoonful or one liquid dram of the composition should be poured onto the root of the thistle where cut off at the surface of the ground, and this will penetrate and kill the root entirely, even if it extends to the depth of many feet from the surface, as the roots of such thistles frequently do.

On repeated trials of the application of caustic soda alone to Canada thistles it was found that while one application would injure the plant it would not destroy it, but that repeated applications were required to accomplish this unless the caustic soda was applied in large quantity. On adding water-glass and borax to the solution or composition it has been ascertained that the composition has the quality that causes it to enter the severed root of the thistle and to kill it on one application of the composition and by the use of a comparatively small quantity thereof.

What we claim as our invention, and desire to secure by Letters Patent, is—

1. The herein-described composition of matter consisting of water, water-glass, caustic soda, and borax, substantially as described.

2. The herein-described composition of matter for killing Canada thistles, consisting of pure water four quarts, water-glass one-half pound, caustic soda (ninety-eight per cent. strength) five pounds, and borax one pound, substantially as described and for the purpose specified.

In testimony whereof we affix our signatures in presence of two witnesses.

FELIX EISCH.
EDWARD RACZINSKI.

Witnesses:
C. T. BENEDICT,
ANNA V. FAUST.